(12) United States Patent
He

(10) Patent No.: US 7,455,231 B2
(45) Date of Patent: Nov. 25, 2008

(54) SYSTEM AND METHOD FOR LOCATING A PREDETERMINED PATTERN WITHIN AN IMAGE

(75) Inventor: Duanfeng He, S. Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 595 days.

(21) Appl. No.: 11/157,735

(22) Filed: Jun. 21, 2005

(65) Prior Publication Data

US 2006/0283953 A1  Dec. 21, 2006

(51) Int. Cl.
*G06K 7/10* (2006.01)

(52) U.S. Cl. .............................. 235/462.1; 235/462.07; 235/462.08; 235/462.12; 235/462.16; 235/462.25; 235/454; 235/462.09

(58) Field of Classification Search .............. 235/462.1, 235/462.07–462.09, 462.12, 462.16, 462.25, 235/454
See application file for complete search history.

(56) References Cited

U.S. PATENT DOCUMENTS 5,689,103 A * 11/1997 Watanabe et al. ...... 235/462.12
5,936,224 A * 8/1999 Shimizu et al. .......... 235/462.1
6,343,742 B2 * 2/2002 Watanabe et al. ...... 235/462.25

FOREIGN PATENT DOCUMENTS

| EP | 0 561 334 | 9/1993 |
| EP | 0 910 032 | 4/1999 |

* cited by examiner

*Primary Examiner*—Michael G. Lee
*Assistant Examiner*—Allyson N Trail
(74) *Attorney, Agent, or Firm*—Fay Kaplun & Marcin, LLP

(57) ABSTRACT

Described is a method of locating a predetermined pattern. An image is divided into a predetermined number of areas. A search sequence indicative of an order in which the areas are to be analyzed for the predetermined pattern is determined. The areas in the search sequence are analyzed until either a predetermined time elapses or the predetermined pattern is detected. When the predetermined time has elapsed before the predetermined pattern is detected, a further image is obtained. Then, areas remaining in the sequence are analyzed in the further image beginning with an area to be analyzed immediately after a last analyzed area of the image until either the predetermined time elapses or the predetermined pattern is detected in one of the remaining areas.

22 Claims, 6 Drawing Sheets

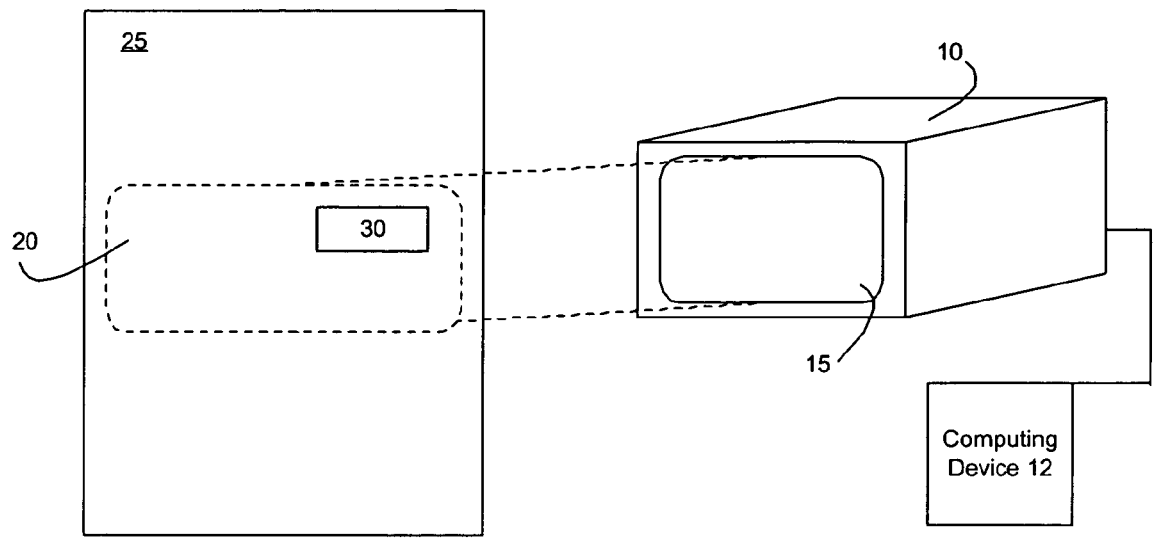
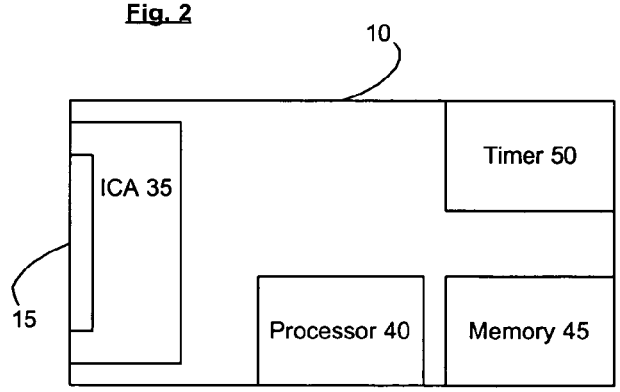

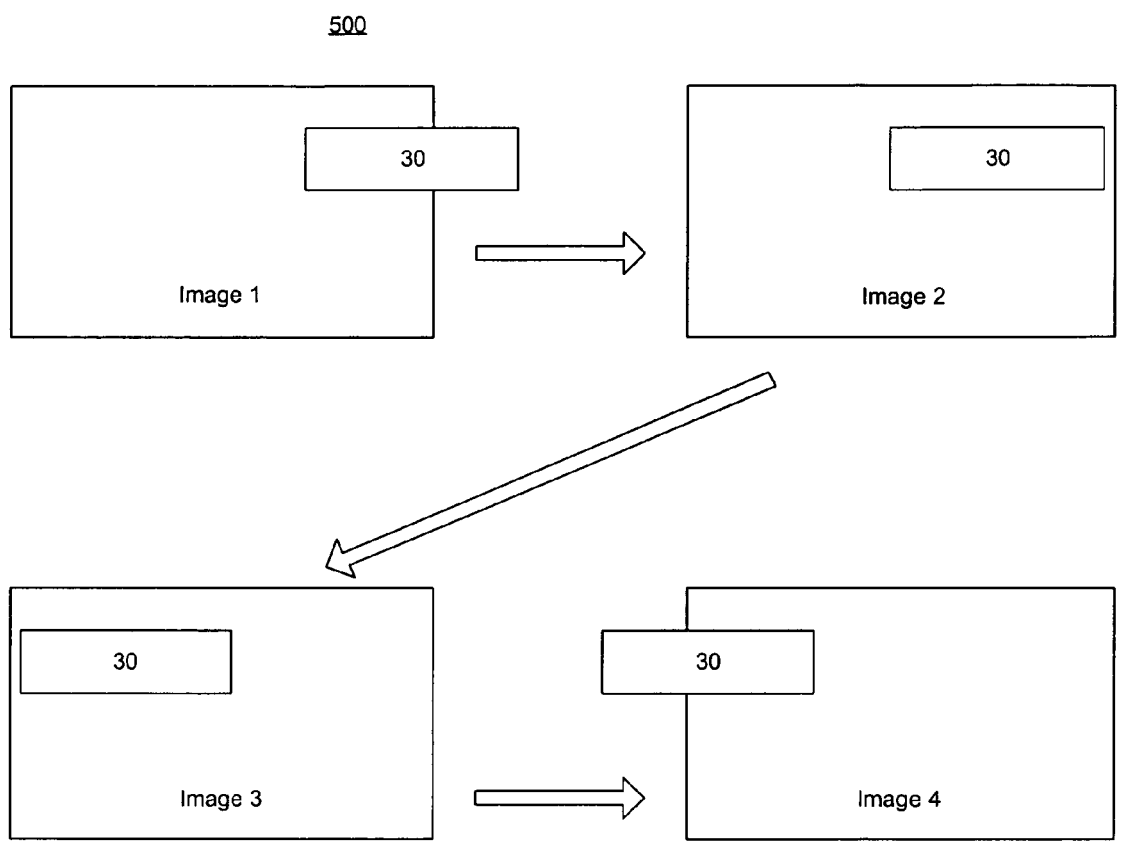

SYSTEM AND METHOD FOR LOCATING A PREDETERMINED PATTERN WITHIN AN IMAGE

BACKGROUND

A conventional scanner is commonly used to capture data from indicia (e.g., a barcode). Examples of the scanner include a swipe scanner and a presentation scanner. The swipe scanner is used to scan an item for the barcode while the item is dynamically passed through a field-of-view of the scanner. For example, at a grocery store, the item is passed through the field in an attempt to scan the barcode. The presentation scanner is used to scan the item for the barcode while the item is presented (e.g., held momentarily) to the field. The conventional scanners are laser scanners. That is, they use a moving laser beam to scan the barcode.

One limitation associated with the laser scanner is that they cannot successfully scan the barcode when it is not significantly aligned with scan lines of the laser. This limitation is more pronounced when the barcode is highly truncated, such as when printed on a smaller item (e.g., a pack of gum, a pen, etc.). Conventionally, the limitation was minimized by incorporating another moving element in the scanner to shift the scan lines around. Another limitation of the laser scanner is the inability to scan a two-dimensional ("2D") barcode, which are experiencing increased use. The 2D barcode may encode additional data (e.g., a product ID, an expiration date, etc.). The 2D barcode imprinted on a driver's license may be scanned for age verification. The laser scanner may only scan some types of 2D barcodes.

A different kind of scanner, an imaging scanner, uses an imaging technology (e.g., a small video/photo camera) to capture an image of the indicia (e.g., the barcode). The imaging scanner obtains an image of the item, and, utilizes a search pattern (e.g., a spiral) to attempt to locate the barcode within the image. The spiral search pattern begins from a center point on the image and expands in a spiral pattern until the barcode is identified. If no barcode is identified, the scanner obtains a further image and begins the spiral search pattern again starting at the center point of the further image. This process is iterated until the barcode is identified within one of the images. The imaging scanner does not have scan lines, and, as such, may be made into the presentation scanner. That is, the imaging scanner may locate the barcode in the field, wherever it may be. However, the imaging scanner is generally a poor choice for the swipe scanner, because a processing time for each image is too long. Due to the longer processing time, the imaging scanner may skip over intermediate images before obtaining the further image, and the barcode may have passed through the field-of-view without an image containing the barcode ever being analyzed.

SUMMARY OF THE INVENTION

The present invention relates to a method of locating a predetermined pattern. An image is divided into a predetermined number of areas. A search sequence indicative of an order in which the areas are to be analyzed for the predetermined pattern is determined. The areas in the search sequence are analyzed until either a predetermined time elapses or the predetermined pattern is detected. When the predetermined time has elapsed before the predetermined pattern is detected, a further image is obtained. Then, areas remaining in the sequence are analyzed in the further image beginning with an area to be analyzed immediately after a last analyzed area of the image until either the predetermined time elapses or the predetermined pattern is detected in one of the remaining areas.

BRIEF DESCRIPTION OF THE DRAWINGS

FIG. 1 shows an exemplary embodiment of a system according to the present invention;

FIG. 2 shows an exemplary embodiment of an imaging device according to the present invention;

FIG. 5 shows an exemplary embodiment of a series of images according to the present invention.

DETAILED DESCRIPTION

Figure 3:
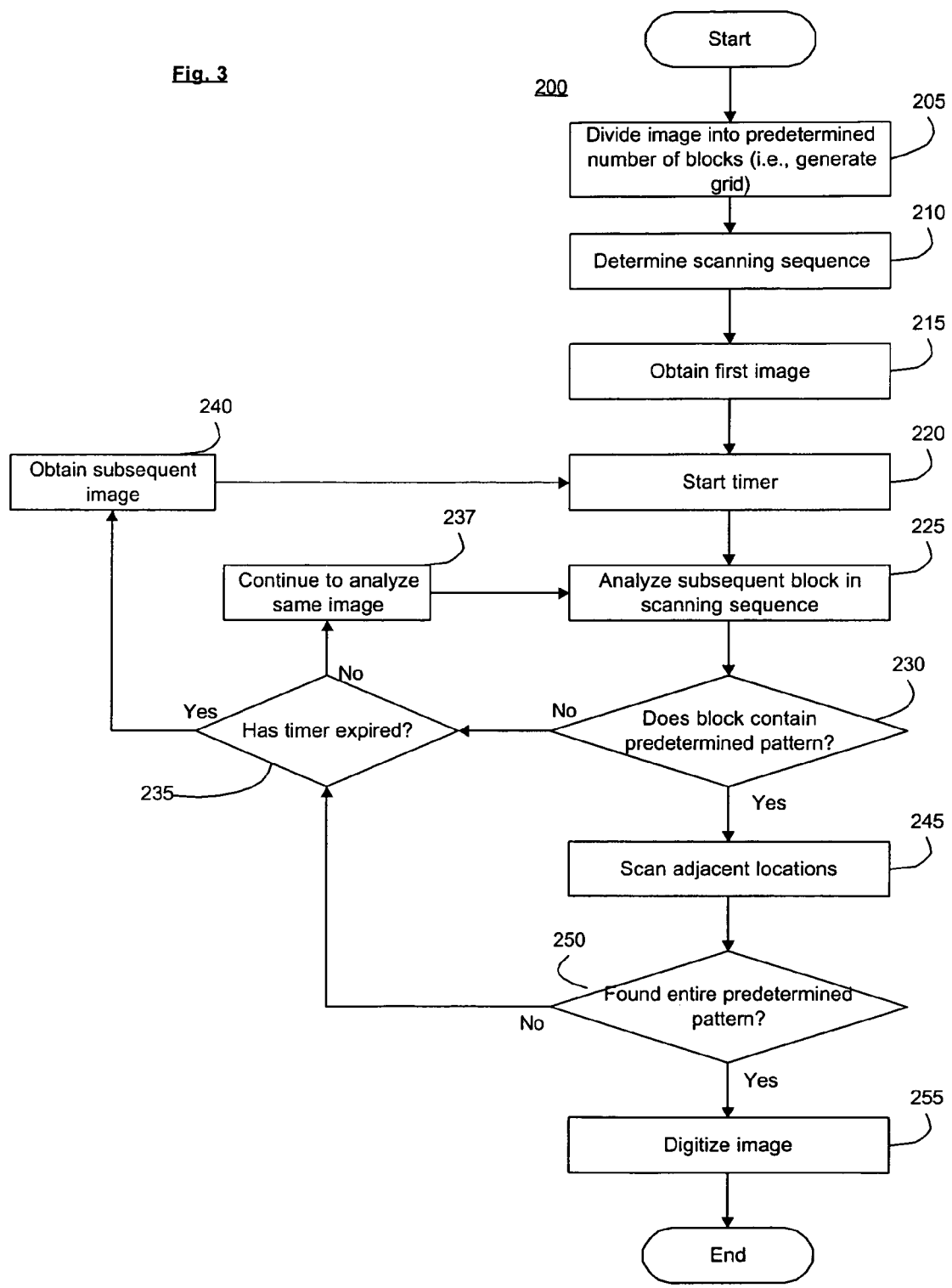
FIG. 3 shows an exemplary embodiment of a method according to the present invention.

The present invention may be further understood with reference to the following description and the appended drawings, wherein like elements are referred to with the same reference numerals. An exemplary embodiment of the present invention provides a predetermined search sequence which allows an imaging device to identify a predetermined pattern within an image generated thereby.

FIG. 1 shows an exemplary embodiment of a system 5 according to the present invention. The system 5 includes an imaging device (e.g., a scanner 10) which may be coupled via a wired or a wireless connection to a computing device 12. The scanner 10 captures one or more images to identify a predetermined pattern therein, as will be explained below. The computing device 12 may be, for example, a PC, a laptop, a server, a handheld computer, etc.

In one embodiment, the scanner 10 includes an image capture arrangement ("ICA") 35 (e.g., a camera) having a lens 15, a processor 40, a memory 45 and a timer 50 (shown in FIG. 2). The lens 15 and one or more characteristics thereof (e.g., magnification, convexity, etc.) may define an imaging area 20 generated by the scanner 10. Those of skill in the art will understand that a size, shape and orientation of the imaging area 20 may be manipulated by adjusting the characteristic(s). The images generated by the scanner 10 may have substantially similar dimensions to the imaging area 20.

In operation, an item 25 to be scanned may be presented within the imaging area 20 of the scanner 10. As stated above, the item 25 may be dynamically passed through the imaging area 20 (e.g., a swipe scan) or held stationary in or near the imaging area 20 (e.g., a presentation scan). In either embodiment, the scanner 10 may generate at least one image of a portion of the item 25. Those of skill in the art will understand that the item 25 is typically positioned with a predetermined pattern (e.g., a barcode 30) thereon facing the scanner 10, and in particular, within the imaging area 20. As such, the item 25 may be positioned by a user (e.g., grocery clerk, warehouse employee, etc.) of the system 5, or, the item 25 may be disposed on a platform (e.g., a conveyor belt, assembly line) which passes the item 25 through the imaging area 20 for scanning.

Those of skill in the art will understand that the barcode 30 may be one- or two-dimensional, and be of any size and shape. Further, the present invention contemplates that the barcode 30 may be oriented in any manner. For example, although FIG. 1 shows the barcode 30 as oriented horizontally within the imaging area 20, those of skill in the art will understand that, the barcode 30 may be oriented at an angle and/or upside-down. While the orientation of the barcode 30 within the imaging area 20 may depend on a movement of the item 25 through the field 30, the orientation may further depend on manipulation of the scanner 10. For example, if the user holds the scanner 10 upside-down, the barcode 30 in the image may be upside-down.

While the scanner 10 acquires the image(s), the processor 40 in the scanner 10 may use a digital image processing technique to decode the image and extract any data contained therein. In one embodiment, the processor 40 stores the data in a memory 45 and/or transmits the data to the computing device 12. Those of skill in the art will understand that the memory 45 may be a volatile memory and/or a non-volatile memory, or any combination thereof. Further, the memory 45 may store applications executable by the processor 40 and the data obtained from decoding the images. When decoding the image(s), the scanner 10 may utilize the timer 50, as will be described below.

An exemplary embodiment of a method 200 according to the present invention is shown in FIG. 3. In step 205, the processor 40 divides a frame into a predetermined number of locations (e.g., blocks 305). To generate the blocks 305, the processor 40 obtains the first size (e.g., 640×480 pixels) of the frame and divides it by a second size (e.g., 8×8 pixels) of each block 305. For example, if the first size is 640×480 pixels and the second size of is 8×8 pixels, then the predetermined number of blocks 305 would be 80×60 (i.e., (640*480)/(8*8)). Thus, the frame would be divided into an arrangement (e.g., a grid) of 4800 8×8 pixel blocks 305. Although, in this manner, the frame would be divided into non-overlapping blocks, those of skill in the art will understand that partially overlapping blocks may be utilized by modifying, for example, the second size and/or the predetermined number.

In another embodiment, the processor 40 may recognize the first size of the frame and map the arrangement thereonto. For example, in this embodiment, when the scanner 10 generates the frame, the processor 40 recognizes that the first size is 640×480 pixels. The processor 40 then obtains the corresponding arrangement (e.g., the 4800 8×8 pixel blocks 305) stored in the memory 45, and maps it onto the frame. In this embodiment, the memory 45 may store a plurality of arrangements which correspond to a plurality of, for example, sizes of the frame and/or sizes of the blocks 305.

In step 210, the processor 40 determines a search sequence which is indicative of a preselected order in which the blocks 305 will be examined/analyzed in an attempt to identify the barcode 30. In a preferred embodiment, the search sequence may be determined by an algorithm stored on the memory 45 and executed by the processor 40 of the scanner 10. The sequence may be represented by an equation set which determines the preselected order of blocks 305 to be analyzed. In an exemplary embodiment, the equation set is generally shown as:

$x_i = (i*m) \bmod M$ $y_i = (i*n) \bmod N$ for i>=0, where m, n, M, N are integer constants.

In one exemplary embodiment, the equation set is:

$x_i = (i*19) \bmod 78$ $y_i = (i*35) \bmod 58$

The equation set gives (x,y) pairs in a rectangular range of points bounded by a first point (e.g., (0,0)) and a second point (e.g., (77,57)). In this embodiment, if the range of points are biased by one in both the x and y coordinates, the range may fit in an interior of the aforementioned 80×60 blocks. That is, the range may extend to an area of 78×58 blocks without reaching any borders of the 80×60 block configuration. Those of skill in the art will understand that use of the equation set above may cover all blocks with coordinates in the range of (1,1) to (78,58) where the coordinates sum to an even number, before the sequence is repeated.

As understood by those of skill in the art, the first size of the frame, the second size of the block 305 and the arrangement may vary dependent on each other or independently thereof. For example, increasing the second size may reduce processing time, whereas, reducing the second size may provide a more refined coverage of the frame. More refined coverage may be useful for identification of smaller barcodes and/or barcodes at an extended distance from the scanner 10. For example, in another exemplary embodiment of the equation set may utilize a further second size (e.g., 16×16 pixels) of the blocks 305 in the first size of the frame. Thus, a further arrangement may be generated which comprises 40×30 blocks of the second size. In this other embodiment, the equation set is:

$x_i = (i*5) \bmod 38$ $y_i = (i*23) \bmod 28$

Figure 6:
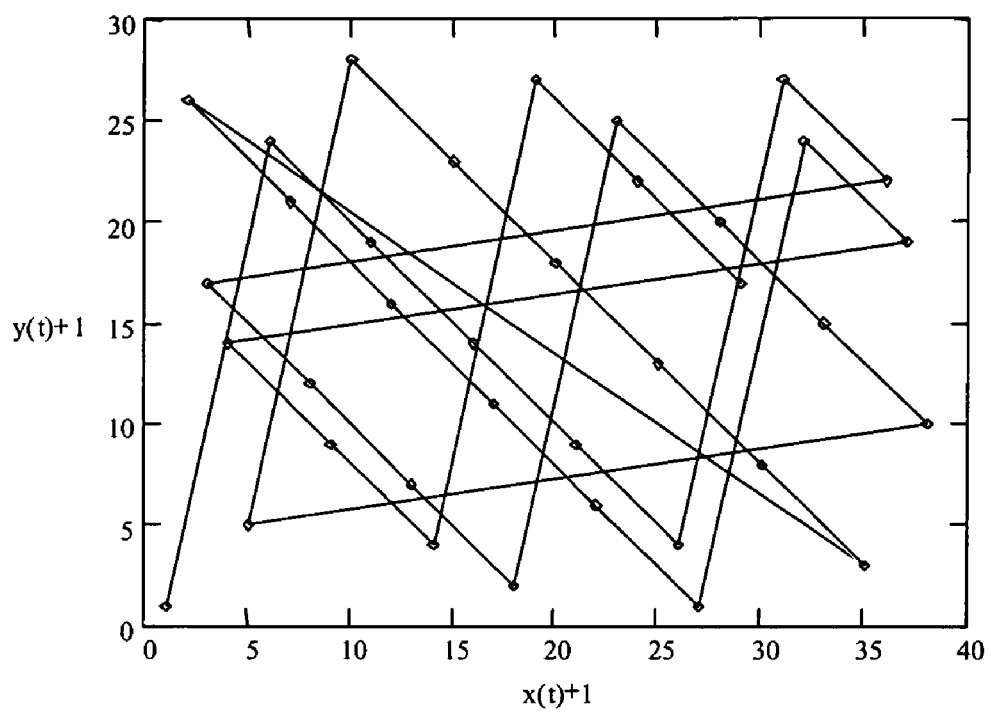
FIG. 6 shows a further exemplary embodiment of the search sequence according to the present invention.

According to this equation set, the first thirty-seven blocks analyzed are shown in FIG. 6. Thus, the equation set is generated with a goal of analyzing substantially all portions of the image.

In another embodiment, the search sequence may be derived from a pseudo-random number generator. That is, a block to process is chosen randomly from the arrangement. That block is not analyzed again until all blocks within the search sequence have been analyzed.

Figure 4A:
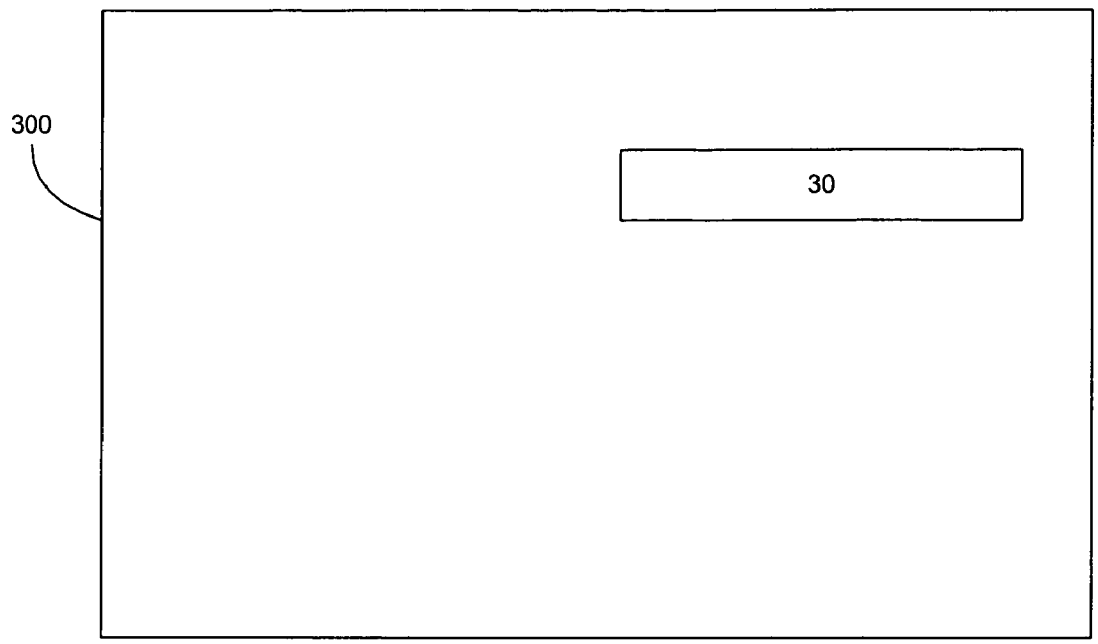
FIG. 4a shows an exemplary embodiment of an image generated by the imaging device.
Figure 4B:
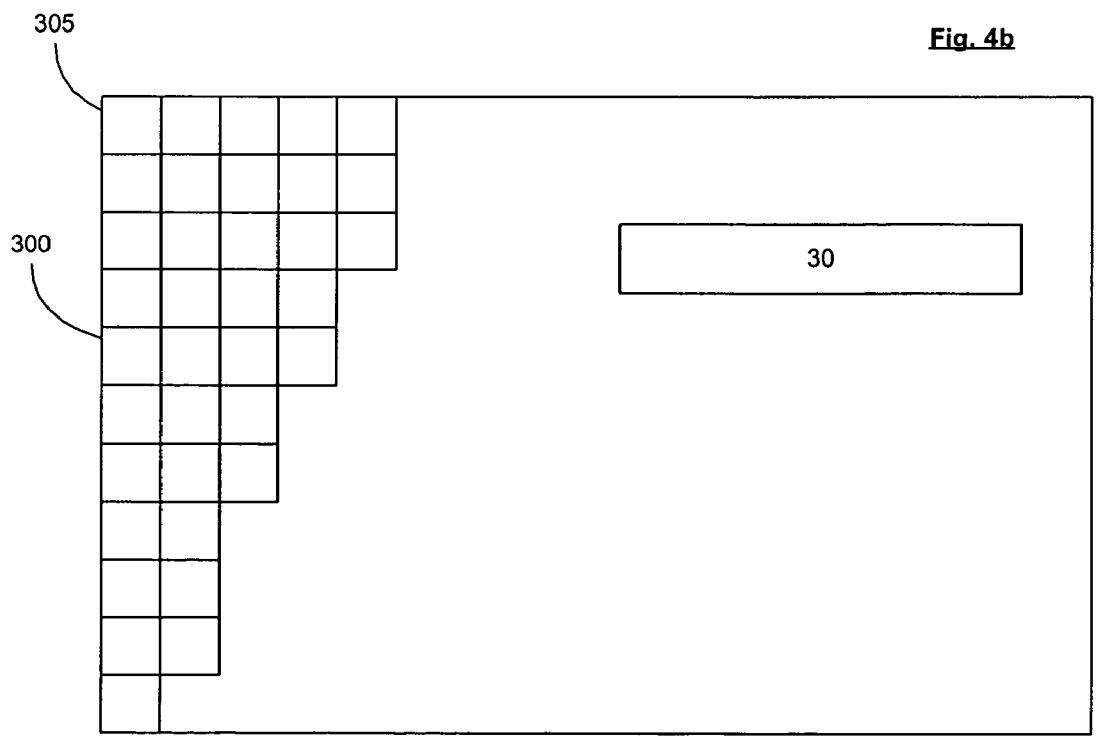
FIG. 4b shows an exemplary embodiment of the image of FIG. 4a divided into a plurality of locations according to the present invention.
Figure 4C:
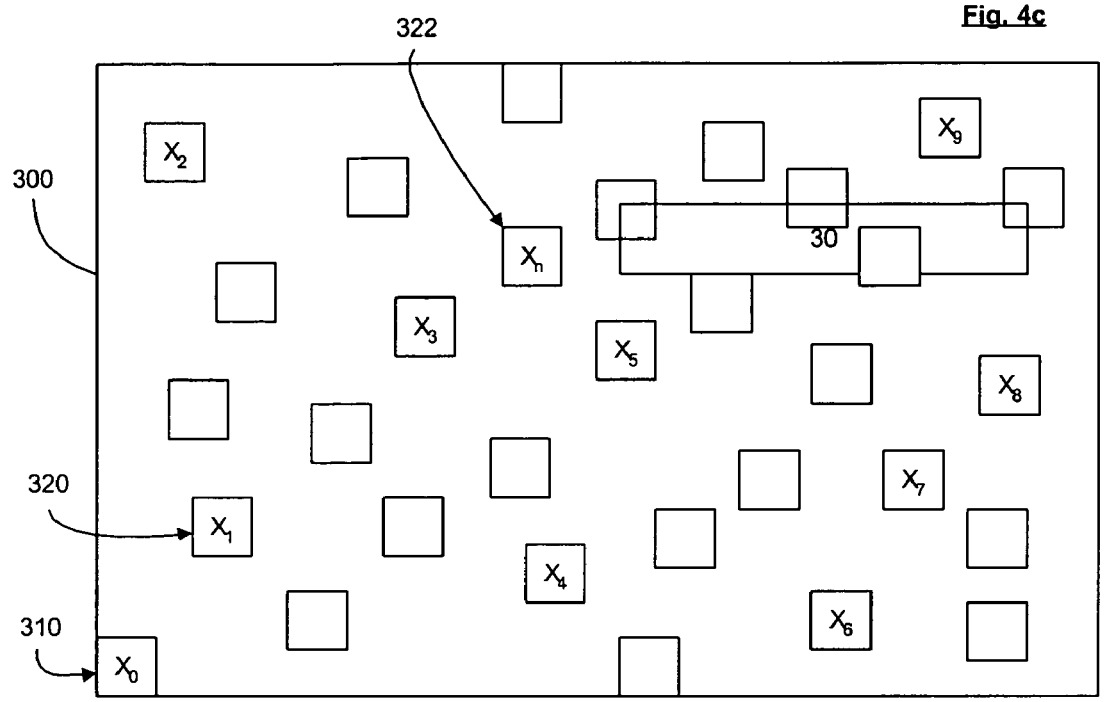
FIG. 4c shows an exemplary embodiment of a search sequence according to the present invention.

In the preferred embodiment, as shown in FIG. 4c, the sequence may begin with a first block 310 which is located at an origin (e.g., (0,0)) of the frame. Then, a next block (e.g., a second block 320) in the preselected order will be analyzed as a function of a previous block (e.g., according to the equation set). For example, the second block 320 after the first block 310 may have coordinates (19,35) which are calculated utilizing the first equation set as follows:

$x_1 = 19 = (19) \bmod 78$ $y_1 = 35 = (35) \bmod 58$

Accordingly, the sequence may not be repeated until, for example, every block 305 which is included in the sequence is analyzed. Those of skill in the art will understand that in another embodiment, an iterative approach may be used, such as:

$x_{i+1} = x_i + m;$ if $(x_{i+1} >= M)$ $x_{i+1} = x_{i+1} - M;$

Although this embodiment is mathematically equivalent to the above embodiments which utilize the modulo operation, this embodiment does not involve multiplication/division and may be implemented faster on some processors.

In step 215, the scanner 10 obtains a first image 300, shown in FIG. 4a, from a series of images generated during scanning of the item 25. For example, the scanner 10 may generate and analyze approximately 30 images per second. As described above, the scanner 10 may generate the series of images and process each image within the series in a predetermined order. Alternatively, the scanner 10 may generate the first image 300, and only obtain further images if processing of the first image 300 fails, as will be described below. While the method 200 will be described as being executed by the scanner 10, those of skill in the art will understand that the method 200 may be executed by any device (e.g., the computing device 12) with access to the series of images. After the first image 300 has been obtained, the processor 40 maps the arrangement thereonto, as shown in FIG. 4b.

As shown in FIG. 4a, the first image 300 includes the barcode 30 located at a region therein. However, due to, for example, motion of the item 25 through the imaging area 20, orientation of the item 25 with respect to the scanner 10, or various other factors, the barcode 30 may not be in a center of the first image 300, as depicted in a series of images 500 shown in FIG. 5. The images 500 may be generated during, for example, a swipe scan, as the item 25 is passed through the imaging area 20. Thus, those of skill in the art will understand that the barcode 30 or only a portion thereof may be located at any region within the first image 300, or the barcode 30 may not be located in the first image 300. These scenarios will be addressed below.

In step 220, the processor 40 starts the timer 50 which is set at a first value and expires when it reaches a second value (e.g., zero). A difference between the first and second values represents a time for which the processor 40 may analyze blocks 305 in the sequence on the first image 300. In another embodiment, the time for which the processor 40 analyzes the blocks 305 in the first image 300 is a time between arrival of consecutive images according to a frame rate (e.g., 30 frames/second). When the timer 50 expires, the processor 40 moves to a next image in the series of images generated by the scanner 10. In this embodiment, the next image would be a second image 315 in the series. However, those of skill in the art will understand that the next image and the previous image may be separated by n image(s) (e.g., every third image). Further, those skilled in the art will understand that the timer 50 implemented in hardware or a software function executed on the processor 40.

In step 225, the processor 40 analyzes the block 305 in the sequence. In a first iteration of the method 200, in step 225, the processor 40 analyzes the first block 310. In operation, the processor 40 analyzes the image within a boundary defined by the second size of the block 305. For example, in the 8×8 pixel block 305, the processor 40 analyzes the 64 pixel area to determine if at least a portion of the barcode 30 is located therein. Alternatively, the processor 40 analyzes the block 305 and blocks adjacent thereto to determined if the portion of the barcode 30 is located therein.

In step 230, the processor 40 determines whether the first block 310 contains at least the portion of the barcode 30. That is, the entire barcode 30 may not fit within the first block 305. Thus, the portion of the barcode 30 may include any indicia which would represent to the processor 40 that the portion of the barcode 30 has been identified. For example, the portion of the barcode 30 may be one or more parallel bars, of any thickness, and, optionally, having a predefined spacing therebetween. Thus, the processor 40 may be programmed to identify the portion of any one- and/or two-dimensional barcodes.

In step 235, the first block 310 does not include the portion of the barcode 30, so the processor 40 determines whether the timer 50 has expired. If the timer 50 has not expired, the processor 40 continues examining/analyzing blocks in the same image (e.g., the first image 300), as shown in step 237. Thus, the processor 40 analyzes the next block (e.g., the second block 320) in the sequence (step 225). Thus, the processor 40 may continue analyzing blocks in the sequence until the timer 50 expires or the portion of the barcode 30 is identified.

In step 240, the timer 50 has expired, so the processor 40 obtains a subsequent image (e.g., the next image) in the series of images. As described above, the next image may be the second image 315 or the image which is n images from the first image 300. In this embodiment, after the second image 315 is obtained, the processor 40 maps the arrangement onto the second image 315 and starts the timer 50 (step 220). After the timer 50 is started, the processor 40 analyzes a fourth block 325 which is immediately after a last block (e.g, a third block 322) analyzed in the sequence on the first image 300, which will be described with reference to FIGS. 4c and 4d.

FIG. 4c shows the first image 300 divided into the predetermined number of blocks 305. Thus, in the first iteration, the processor 40 begins with the first block 310 and analyzes each block in the sequence until either the timer 50 expires or the portion of the barcode 30 is identified. The sequence in the first iteration is shown by blocks marked $X_0$-$X_n$ where n represents a number of blocks analyzed before the timer 50 expires. The block marked $X_n$ represents a last block in the sequence analyzed on the first image 305. The sequence of blocks $X_0$-$X_n$ is generated such that, after analysis of each, substantially the entire area of the first image 300 is analyzed. When the timer 50 expires, the processor 40 has reached the third block 322 without identifying the portion of the barcode 30. Thus, the processor 40 obtains the second image 315 which is shown in FIG. 4d.

Figure 4D:
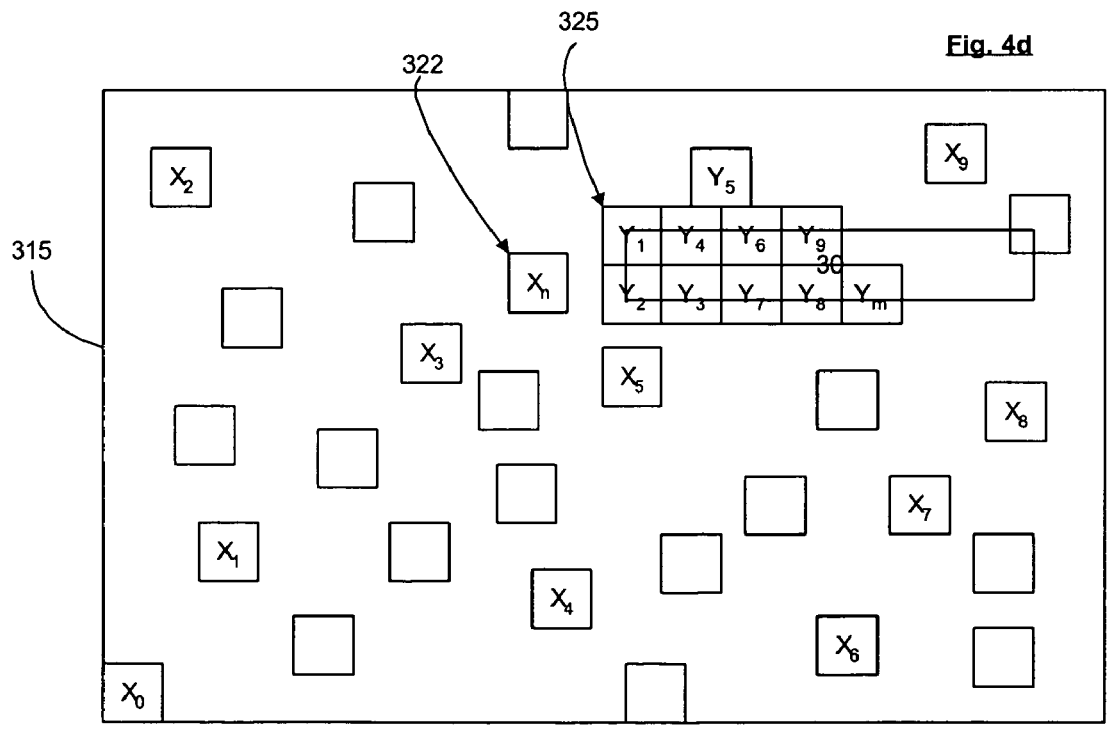
FIG. 4d shows another exemplary embodiment of the search sequence according to the present invention.

In FIG. 4d, the second image 315 may be identical to the first image 300. That is, the barcode 30 may be located in a substantially similar position in the first and second images 300,315. However, it is possible that the barcode 30 may have moved to a new position within the second image due to, for example, motion of the item 25 while scanning. According to the present invention, the user may maintain the item substantially stationary (e.g., presentation scanning) or in continuous motion (e.g., swipe scanning).

In the second image 315, the processor 40 continues processing the search sequence, beginning with the fourth block 325 which is the next block in the sequence after the third block 322 (e.g., last block analyzed in the first image 300). That is, the processor 40 does not start from the first block 310 in the second image 315. The sequence in the second iteration is shown by blocks marked $Y_0$-$Y_m$ where m represents a number of blocks analyzed before the timer 50 expires. The block marked $Y_m$ represents a last block in the sequence analyzed on the second image 315. This optimization may greatly reduce a number of images, and resultantly, a time, the processor 40 must utilize in order to identify the barcode 30, when the scanner operates in a presentation scan mode. In a swipe scan mode, the search sequence may be sufficiently random, give the number of blocks 305 processed in each image (e.g., about 100 or more blocks processed per image) that all areas of the images are substantially evenly covered.

Referring back to FIG. 3, in step 245, the processor 40 has identified the portion of the barcode 30 in the fourth block 325, so the processor 40 may generate a virtual scan line perpendicular to the bars found in the block 325 and initiate a scan of the barcode 30. In another embodiment, the processor 40 analyzes blocks adjacent thereto attempting to identify the entire barcode 30. The adjacent blocks may be determined as a function of an orientation of the portion of the barcode 30 within the fourth block 325. For example, in the embodiment shown in FIG. 4d, the processor 40 may determine that the orientation of the portion of the barcode 30 is a bar or part of a bar. Thus, the processor 40 may modify the sequence to include the blocks within a predetermined area. In one embodiment, the predetermined area may be determined by drawing a line perpendicularly through the bar. Thus, any block within a predetermined distance (e.g., above and below) away from the line may be included in the modified sequence. A length of the line may be determined as a function of a length of the barcode 30. The modified sequence is shown as a second series of lines following the fourth block 325 in FIG. 4d.

In one embodiment, the processor 40 suspends the timer 50 after it has identified the portion of the barcode 30. Thus, while analyzing the adjacent blocks, the processor 40 remains on a single image (e.g., the second image 315). However, those of skill in the art will understand that, in another embodiment, the processor 40 may obtain the next image when the timer 50 expires, and begin analyzing at the block after the last block scanned, as described above. However, in the next image (e.g., a third image), the processor 40 will begin analyzing blocks according to the modified sequence.

Further, during use of the modified sequence, the processor 40 may utilize an empty-block tolerance. Thus, if one of the blocks 305 in the modified sequence does not contain a further portion of the barcode 30, the processor 40 may continue analyzing the blocks 305 according to the modified sequence. The tolerance may be, for example, any predefined number (e.g., three) of empty blocks analyzed successively. Further, the tolerance may reset if the processor 40 identifies the further portion of the barcode 30 within the predefined number of empty blocks. For example, if there is an empty block in the modified sequence, the processor 40 may continue analyzing the blocks 305 up to the tolerance. If none of the next three blocks contain the further portion of the barcode 30, the processor 40 may either revert back to the original sequence (step 225) or modify the modified sequence to include a larger area around the fourth block 325.

In step 250, the processor 40 determines whether the entire predetermined pattern (e.g., the barcode 30) has been identified. If there is a portion of the barcode 30 which remains to be identified, the processor 40 may determine whether the timer 50 has expired, and, if not, continue analyzing the blocks according to the modified sequence. In another embodiment, the processor 40 may revert to the original sequence and begin analyzing blocks remaining therein. If the entire barcode 30 has been identified, the processor 40 digitizes the image of the barcode 30, as shown in step 255. The digitized image may be stored in the memory 45 and/or transmitted to the computing device 12. Optionally, the processor 40 may determine, after step 255, whether the decoding of the image was successful. If not, the processor 40 may determine whether the timer 50 has expired and continue scanning analyzing blocks/images accordingly.

It will also be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method of locating a predetermined pattern, comprising:
   dividing an image into a predetermined number of areas;
   determining a search sequence indicative of an order in which the areas are to be analyzed for the predetermined pattern;
   analyzing the areas in the search sequence until one of (i) a predetermined time elapses and (ii) the predetermined pattern is detected; and
   when the predetermined time has elapsed before the predetermined pattern is detected, obtaining a further image and then analyzing areas remaining in the sequence in the further image beginning with an area to be analyzed immediately after a last analyzed area of the image until one of (i) the predetermined time elapses and (ii) the predetermined pattern is detected in one of the remaining areas.

2. The method according to claim 1, wherein the predetermined pattern is at least a portion of one of a one-dimensional barcode and a two-dimensional barcode.

3. The method according to claim 1, wherein the areas have a predetermined size and shape.

4. The method according to claim 1, wherein the determining step further includes:
   generating the order so that every area in the sequence is analyzed before the sequence is repeated.

5. The method according to claim 1, further comprising:
   when the predetermined pattern has been detected in the analyzed area, determining areas adjacent to the area;
   analyzing the adjacent areas to obtain a sub-image, the sub-image including the predetermined pattern;
   decoding the sub-image to extract data.

6. The method according to claim 5, wherein the sub-image is a barcode data.

7. The method according to claim 5, wherein the adjacent areas are determined according to the substeps:
   determining a location and an orientation of the predetermined pattern within the analyzed area; and
   determining the adjacent areas a function of at least one of (i) the location and (ii) the orientation.

8. The method according to claim 1, wherein prior to the dividing step, the method further comprising:
   obtaining the image during one of (i) a swipe scan and (ii) a presentation scan.

9. The method according to claim 1, wherein the determining step further includes:
   generating the order according to one of:
   (i) $x_i=(i*m) \bmod M$
   $y_i=(i*n) \bmod N$
   for i>=0, where m, n, M, N are integer constants, and
   (ii) a sequence derived from a pseudo-random number generator.

10. The method according to claim 1, wherein the predetermined time is a time between an arrival of the image and an arrival of the further image.

11. A device, comprising:
    an image capture arrangement capturing at least one image; and
    a processor dividing the image into a predetermined number of areas, the processor determining a search sequence indicative of an order in which the areas are to be analyzed for a predetermined pattern, the processor analyzing the areas in the search sequence until one of (i) a predetermined time elapses and (ii) the predetermined pattern is detected, wherein, when the predetermined time has elapsed before the predetermined pattern is detected, the processor obtains a further image and then analyzes areas remaining in the sequence in the further image beginning with an area to be analyzed immediately after a last analyzed area of the image until one of (i) the predetermined time elapses and (ii) the predetermined pattern is detected in one of the analyzed areas.

12. The device according to claim 11, wherein the predetermined pattern is at least a portion of one of a one-dimensional barcode and a two-dimensional barcode.

13. The device according to claim 11, wherein the areas have a predetermined size and shape.

14. The device according to claim 11, wherein the processor generates the order so that every area in the sequence is analyzed before the sequence is repeated.

15. The device according to claim 11, wherein, when the predetermined pattern has been detected in the analyzed area, the processor determines areas adjacent to the analyzed area, the processor analyzing the adjacent areas to obtain a sub-image, the sub-image including the predetermined pattern, and the processor decoding the sub-image to extract data.

16. The device according to claim 15, wherein the sub-image is a barcode.

17. The device according to claim 15, wherein, when the processor determines the adjacent areas, the processor determines a location and an orientation of the predetermined pattern within the analyzed area and the processor determines the adjacent areas a function of at least one of (i) the location and (ii) the orientation.

18. The device according to claim 11, wherein the processor obtains the image during one of (i) a swipe scan and (ii) a presentation scan.

19. The device according to claim 11, wherein the processor generates the order according to one of:
 (i) $x_i = (i*m) \bmod M$
  $y_i = (i*n) \bmod N$
  for $i >= 0$, where m, n, M, N are integer constants, and
 (ii) a sequence derived from a pseudo-random number generator.

20. The device according to claim 11, wherein the device is an image scanner.

21. The device according to claim 11, wherein the predetermined time is a time between an arrival of the image and an arrival of the further image.

22. A computer-readable storage medium storing a set of instructions, the set of instructions capable of being executed by a processor, the set of instructions performing the steps of:
 dividing an image into a predetermined number of areas;
 determining a search sequence indicative of an order in which the areas are to be analyzed for a predetermined pattern;
 analyzing the areas in the search sequence until one of (i) a predetermined time elapses and (ii) the predetermined pattern is detected; and
 when the predetermined time has elapsed before the predetermined pattern is detected, obtaining a further image and then analyzing areas remaining in the sequence in the further image beginning with an area to be analyzed immediately after a last analyzed area until one of (i) the predetermined time elapses and (ii) the predetermined pattern is detected in one of the analyzed areas.

* * * * *